(12) United States Patent
Hayakawa et al.

(10) Patent No.: US 8,479,198 B2
(45) Date of Patent: Jul. 2, 2013

(54) HYPERVISOR AND SERVER APPARATUS CAPABLE OF RESTORING DATA INSIDE A FAILURE AREA

(75) Inventors: Norimitsu Hayakawa, Inagi (JP); Takao Totsuka, Hadano (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 13/023,214

(22) Filed: Feb. 8, 2011

(65) Prior Publication Data

US 2011/0202919 A1    Aug. 18, 2011

(30) Foreign Application Priority Data

Feb. 17, 2010 (JP) ................................ 2010-031976

(51) Int. Cl.
*G06F 9/455* (2006.01)
(52) U.S. Cl.
USPC ............................................................ 718/1
(58) Field of Classification Search
None
See application file for complete search history.

(56) References Cited

U.S. PATENT DOCUMENTS

| 2002/0087611 A1* | 7/2002 | Tanaka et al. ............... 709/1 |
| 2007/0180312 A1 | 8/2007 | Rhodes et al. |
| 2010/0299666 A1* | 11/2010 | Agbaria et al. ............. 718/1 |

FOREIGN PATENT DOCUMENTS

| JP | 2006-243852 | 9/2006 |
| JP | 2007-207250 | 8/2007 |
| JP | 2009-199478 | 9/2009 |

* cited by examiner

*Primary Examiner* — Emerson Puente
*Assistant Examiner* — Gregory A Kessler
(74) *Attorney, Agent, or Firm* — Foley & Lardner LLP

(57) ABSTRACT

A hypervisor sets all physical areas in an allocation area, which is allocated to a virtual machine from within a physical memory and is configured from a plurality of physical areas, to a write protect mode. In a case where a physical processor identifies that the write-destination area from the virtual machine is in the write protect mode, the hypervisor manages the write-destination area as an updated area, and cancels the write protect mode of the write-destination area. At a certain point in time, the hypervisor copies data inside the updated physical area from within the allocation area to a storage area (a copy area) that differs from the allocation area. In a case where a prescribed failure is detected in the physical area, the hypervisor restores data from the copy area.

12 Claims, 7 Drawing Sheets

# HYPERVISOR AND SERVER APPARATUS CAPABLE OF RESTORING DATA INSIDE A FAILURE AREA

CROSS-REFERENCE TO RELATED APPLICATIONS

This application relates to and claims the benefit of priority from Japanese Patent Application No. 2010-31976 filed on Feb. 17, 2010, the entire disclosure of which is incorporated herein by reference.

BACKGROUND

The present invention relates to virtualization technology that uses a hypervisor.

Server virtualization is known as fundamental technologies like server consolidation or cloud computing. According to server virtualization, one physical computer is logically partitioned into multiple computers, and an OS (Operating System), application software, and other such computer programs are executed on each of the partitioned computers. A partitioned computer, for example, is called a "virtual machine".

In server virtualization, it is desirable to enhance the fault tolerance of the virtual machine. Hardware failures may include a processor failure, a chipset failure, or a memory failure, one of which is a Memory Uncorrectable Error (abbreviated as MUE). A MUE is an error in which memory is unable to be corrected due to memory bit inversion. A MUE is generally not a hardware malfunction, but rather a transient failure. Therefore, normally it is not necessary to replace the memory in which the MUE occurred. In a case where the data is normal, this memory may continue to be used.

Memory mirroring is conceivable as a method for restoring the data inside the memory area where the MUE occurred. For example, Japanese Patent Laid-Open Publication No. 2006-243852 discloses a technology in which a memory transferring part in an operation system transfers data in the operation memory to a memory copy part in a stand-by system. However, in accordance with this technology, a platform comprising all sorts of mechanisms (a common bus, a dedicated copy mechanism, a dedicated transfer mechanism, a write address monitoring mechanism, a temporary storage area, a dual writing mechanism) are required.

Simply stated, memory mirroring is a method that consumes two times the memory. However, this is difficult to apply to server virtualization. This is because, in server virtualization, physical memory is used in multiple virtual machines, and a scheme for holding down on memory usage is required.

For example, there is the technology disclosed in Japanese Patent Laid-Open Publication No. 2009-199478 related to memory usage. According to this technology, when the OS and a firmware hot-plug function are used, and the memory used by OS has been exhausted, memory mirroring is dynamically invalidated. According to this technology, the guest OS has to support the hot-plug.

Memory mirroring-related technology that does not require special hardware mechanisms and a special guest OS is known (for example, Japanese Patent Laid-Open Publication No. 2007-207250). According to Japanese Patent Laid-Open Publication No. 2007-207250, memory mirroring is realized by using a processor write-protect function.

SUMMARY

Now then, server virtualization that makes use of a hypervisor is known. According to server virtualization that uses a hypervisor, generally speaking, the OS (guest OS) is executed on a LPAR in the virtual machine. LPAR is the abbreviation of a logical partition, and is a logical hardware resource that is based on a physical hardware resource.

A system to which memory mirroring using the write-protect function is applied to server virtualization that utilizes a hypervisor is conceivable.

However, in this system, each time there is a data write to the memory from the guest OS, the write is trapped, and the hypervisor mirrors the written data in the memory. That is, in this system, processing transitions to the hypervisor each time there is a data write to the memory from the guest OS. Therefore, the performance of the physical server apparatus that is executing the hypervisor can drop significantly.

The above-described problem is not limited to a MUE, but rather is also possible for a different type of failure that occurs in the memory (for example, a failure of around the same level as a MUE).

Accordingly, an object of the present invention is to lessen a drop in the performance of a storage apparatus, which is capable of restoring data inside a storage area where a prescribed failure has occurred and is executing a hypervisor.

The hypervisor sets all physical areas in a physical allocation area, which is a storage area of the physical memory that is allocated to a virtual machine and is configured from multiple physical areas, to the write protect mode. In a case where a physical processor inside the server apparatus identifies that the physical area, which is the destination of a write from the server apparatus, is in the write protect mode, the hypervisor manages the write-destination physical area as an updated area, and, in addition, releases the write protect mode of the write-destination physical area. In a case where there is a snapshot acquisition point, the hypervisor copies the data inside the updated physical area from among all the physical areas configuring the physical allocation area to a copy area, which is a storage area that differs from the physical allocation area. In a case where the occurrence of a prescribed failure in the physical area has been detected, the hypervisor restores the data from the copy area that is storing the copy of the data stored in the failure area, which is the physical area in which the prescribed failure occurred.

The server apparatus, for example, may be configured from either one or multiple computers. Furthermore, the physical area may be a physical page, which will be described further below, or a storage area that is either larger or smaller than the physical page.

The fact that all the physical areas configuring the physical allocation area are in the write protect mode may be set in physical area management information (for example, a shadow page table), which is the information that is referenced when the physical processor writes data to the physical area. In this case, the physical processor is able to identify that the write-destination area is the write protect mode from the physical area management information.

The snapshot acquisition point is the point in time at which a snapshot image of the physical allocation area is created.

The prescribed failure in the physical area may be a MUE, or may be a failure other than a MUE. Furthermore, in a case where the data restoration copies the data inside the copy area to the failure area, it is desirable that the above-mentioned prescribed failure not be a memory malfunction comprising the failure area.

The present invention makes it possible to lessen a drop in the performance of a server apparatus, which is able to restore data inside a storage area in which a prescribed failure has occurred, and which is executing a hypervisor.

DETAILED DESCRIPTION

Figure 1:
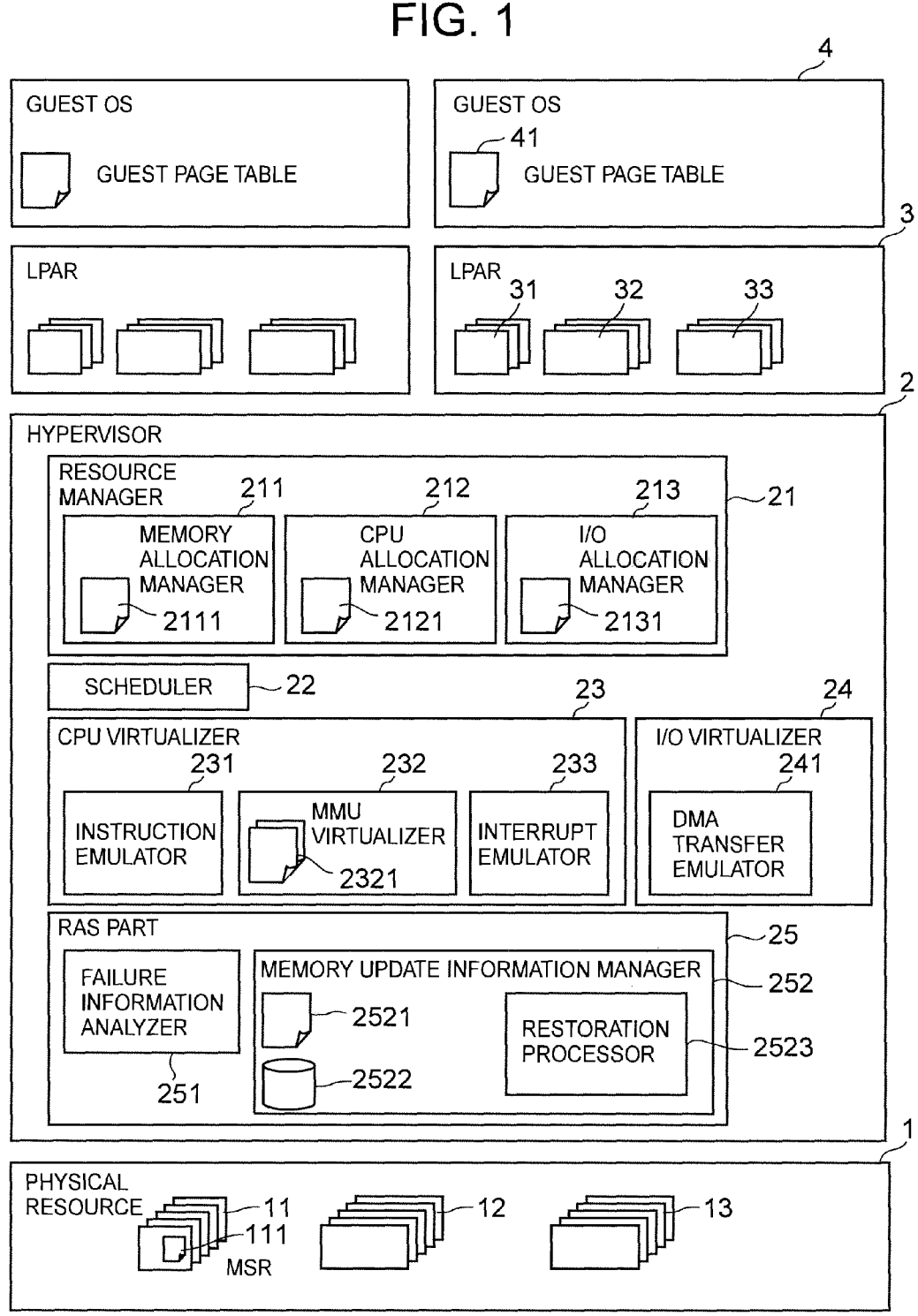
FIG. 1 shows the configuration of a server apparatus related to an embodiment of the present invention.

An embodiment of the present invention will be explained below by referring to the drawings. Furthermore, in the following explanation, there may be cases where processing is explained using a "program" as the subject, but stipulated processing can be performed by a program being executed by a processor while using a storage resource (for example, a memory) as needed. For this reason, the processor may also be considered the subject of the processing. The processor may comprise a hardware circuit that carries out either part or all of the processing performed by the processor. A computer program may be installed in respective computers from a program source. The program source, for example, may be either a program delivery server or a storage medium.

FIG. 1 shows the configuration of a server apparatus related to an embodiment of the present invention.

The physical hardware resources (physical resources) 1 of the server apparatus 100, for example, comprise a physical CPU (Central Processing Unit) (11), a physical memory (12), and a physical I/O (Input/Output) device (13). According to FIG. 1, there are multiples of the physical CPU (11), the physical memory (12) and the physical I/O device (13), but to make the explanation easier to understand, it is supposed that there is one of each hereinbelow. The physical I/O device (13), for example, is a communication interface device (for example, either a HBA (Host Bus Adapter) or a NIC (Network Interface Card)) for communicating via a communication network with machines outside of the server apparatus.

A hypervisor (2) is executed by the physical CPU (11). The hypervisor (2) is able to boot and/or end one or more virtual machines (virtual computers).

A virtual machine is managed by the hypervisor (2), and comprises a LPAR (3) and a guest OS (4).

The guest OS (4) is executed on the LPAR (3), but, in actuality, is executed on at least one physical CPU of the physical CPUs (11). Although not shown in the drawing, a program, such as an application program in a virtual machine, is executed on the guest OS (4).

LPAR (3) is the abbreviation of logical partition, and is a resource, that is, a logical hardware resource obtained by the physical resource (1) having been logically partitioned by the hypervisor (2). Therefore, each LPAR (3) comprises a logical CPU (31), a logical memory (32), and a logical I/O device (33). The logical CPU (31) is a logical CPU that is based on the physical CPU (11). The logical memory (32) is a logical memory that is based on the physical memory (12). The logical I/O device (33) is a logical I/O device that is based on the physical I/O device (13).

Each component will be explained in detail below.

The physical memory (12) is configured from multiple physical storage areas (hereinafter, physical pages).

The logical memory (32) is configured from multiple logical storage areas (hereinafter, logical pages).

The guest OS (4) manages a guest logical address and a guest physical address. The guest logical address is the address of a memory space that is provided to a program, such as an application program, which is executed on the guest OS (4). The capacity of this memory space may be either identical to or differ from the capacity of the logical memory (32) (generally speaking, the memory space will be larger than the logical memory (32)). The guest physical address is the address of a logical page of the logical memory (32).

The guest OS (4) comprises a guest page table (41). The guest page table (41) is information that is referenced when the logical CPU (31) writes data to a logical page. The guest page table (41) comprises an entry for each logical page. An entry comprises a guest physical address and a write protect flag (hereinafter WP flag). The guest OS (4), in a case where a write is prohibited to a certain logical page, sets the WP flag corresponding to this logical page to ON. Alternatively, in a case where a write is enabled to a certain logical page, the guest OS (4) sets the WP flag corresponding to this logical page to OFF. The logical CPU (31) is not able to write data to a logical page for which the WP flag is ON, and is able to write data to a logical page for which the WP flag is OFF.

Each of the physical CPUs in the physical CPU (11) comprises a storage area (for example, a register), for example, a MSR (Model Specific Register) (111), in which is stored information denoting the physical page in the physical memory (12) in which a failure has occurred.

The hypervisor (2), for example, comprises the following functions:

a resource manager (21) for managing physical resources 1;

a scheduler (22) for allocating the physical CPU (11) to multiple LPAR (3);

a CPU virtualizer (23) for emulating the processing of the physical CPU (11);

an I/O virtualizer (24) for virtualizing I/O processing; and a RAS (Reliability, Availability, Serviceability) part (25) for carrying out processing corresponding to a failure when a failure is detected.

The resource manager (21), for example, comprises the following functions:

a memory allocation manager (211) for managing the allocation of physical memory (12) to each LPAR (3) using memory allocation information (2111);

a CPU allocation manager (212) for managing the allocation of the physical CPU (11) to each LPAR (3) using CPU allocation information (2121); and an I/O device allocation manager (213) for managing the allocation of the physical I/O device (13) to each LPAR (3) using I/O allocation information (2131).

The memory allocation information (2111) denotes which physical page group of the physical memory (12) is allocated to which logical memory (32).

The CPU allocation information (2121) denotes the corresponding relationship between the physical CPU (11) and the logical CPU (31).

The I/O allocation information (2131) denotes the corresponding relationship between the physical I/O device (13) and the logical I/O device (33).

The CPU virtualizer (23), for example, comprises the following functions:

an instruction emulator (231) for administering the emulation of a privileged instruction;

a MMU virtualizer (232) for implementing the emulation of a MMU (Memory Management Unit); and an interrupt emulator (233) for emulating an interrupt.

The MMU virtualizer (232) creates a shadow page table (2321) based on a guest page table (41). The shadow page table (2321) will be explained in detail further below.

The I/O virtualizer (24) comprises a DMA (Direct Memory Access) transfer emulator (241) for discerning a memory transfer via a DMA.

The RAS part (25), for example, comprises the following functions:

a failure information analyzer (251) for analyzing the MSR (111) when a failure occurs; and a memory update information manager (252) for administering a function for making an area of a portion of the memory redundant.

The manager (252) comprises a restoration processor (2523) for administering a restoration process when a failure occurs. Furthermore, the manager (252) manages an update management table (2521) and memory difference information (2522). The update management table (2521) shows which physical page data has been updated. The memory difference information (2522) is a logical storage device, and, for example, comprises a logical storage area in which data copied from a physical page is stored, and an alternate memory area. The update management table (2521), the memory difference information (2522) and the alternate memory area will be explained in detail further below.

Figure 2A:
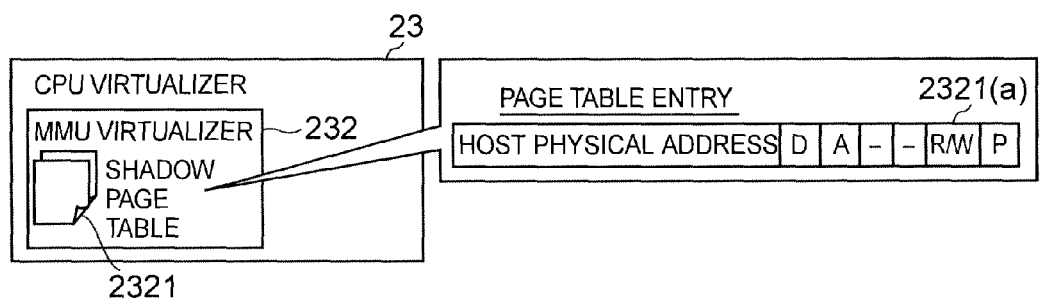
FIG. 2A shows the configuration of a shadow page table (2321)

FIG. 2A shows the configuration of the shadow page table (2321).

The shadow page table (2321) comprises an entry for each physical page. The entry comprises a host physical address, a write protect flag (WP flag) (2321(a)), and various attribute information.

The host physical address is the address of a physical page.

The WP flag (2321(a)) denotes whether or not a write to the physical page is prohibited. In a case where the WP flag (2321(a)) is ON, a write to the physical page is prohibited. In this case, the physical CPU (11) is not able to write data to this physical page. In a case where the WP flag (2321(a)) is OFF, a write to the physical page is enabled. In this case, the physical CPU (11) is able to write data to this physical page.

This shadow page table (2321) is created by the hypervisor (2) based on the guest page table (41). In so doing, a guest physical address to be registered in the shadow page table (2321) is calculated by adding an offset, which corresponds to the LPAR (3) inside the virtual machine comprising this guest page table (41), to a guest physical address registered in the guest page table (41). The guest physical address corresponds to a guest logical address. For this reason, the guest logical address can be used to identify the host physical address (to identify the physical page) based on the shadow page table (2321).

The guest OS (4) is executed by the physical CPU (11) without going through the hypervisor (2). For this reason, it is possible to write data to a physical page from the guest OS (4) without going through the hypervisor (2). For example, the guest OS (4) receives a write request specifying a guest logical address from a program being executed on this guest OS (4). The physical CPU (11), which is executing this guest OS (4), identifies the host physical address corresponding to this guest logical address based on the shadow page table (2321). The physical CPU (11) writes data in accordance with a write request to the physical page denoted by this host physical address. In a case where the WP flag (2321(a)) corresponding to the write-destination physical page is OFF at this time, processing does not transition to the hypervisor (2), but in a case where the WP flag (2321(a)) corresponding to the write-destination physical page is ON, the processing does transition to the hypervisor (2).

Figure 2B:
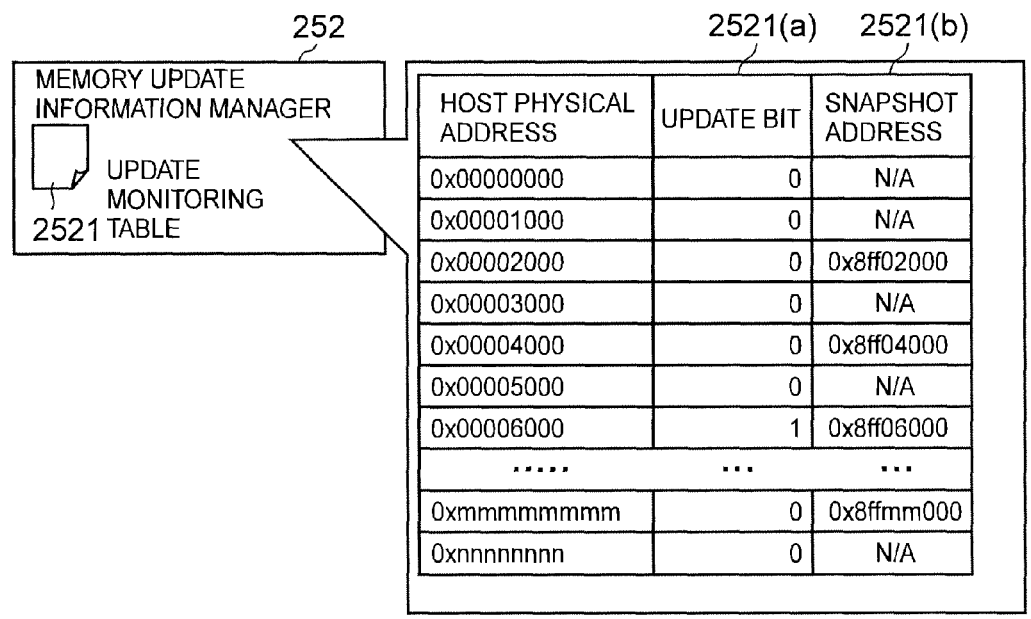
FIG. 2B shows the configuration of an update monitoring table (2521)

FIG. 2B shows the configuration of the update monitoring table (2521). In the following explanation, either all or a part of the physical memory (12) to which the logical memory (32) is allocated will be called the "physical allocation area". Furthermore, an image of the physical allocation area at a certain point in time will be called a "snapshot image", and this certain point in time will be called a "snapshot acquisition point". Furthermore, data of the snapshot image copied from the physical allocation area to another storage area will be called "snapshot data".

The update monitoring table (2521) comprises the following information for each physical page configuring the physical allocation area:

a host physical address corresponding to a physical page;

an update bit (2521(a)) denoting whether or not a physical page was updated (a write was carried out to the physical page) after starting monitoring of whether or not a write was performed; and a snapshot address (2521(b)), which is an address denoting the copy-destination storage area (hereinafter, the copy area) of the snapshot data.

In a case where the update bit (2521(a)) is ON (1), an update has been carried out with respect to the physical page.

"N/A" as the value of the snapshot address (2521(b)) is the abbreviation of Not Assigned, and signifies that there is no copy area corresponding to the physical page, in other words, that not a single update has been carried out with respect to the physical page after data was written to this physical page. Hereinafter, N/A will be called an "invalid value".

There is an entry (row) in which a valid value (copy area address) is set as the snapshot address (2521(b)) even though the update bit (2521(a)) is OFF (0). The valid value in this entry is the address of the storage area in which is stored the snapshot data of a past snapshot image (a snapshot image at a snapshot acquisition point that is prior to the latest snapshot acquisition point). In accordance with this, the snapshot data inside the physical page for which the update bit (2521(a)) is ON (1) at the latest snapshot point of time is copied to the copy area denoted by the snapshot address (2521(b)) corresponding to this physical page.

Furthermore, each entry of the update monitoring table (2521) may comprise the size of the snapshot data. In accordance with this, the monitoring unit may be a logical page managed by the guest OS (4) rather than a physical page.

Figure 2C:
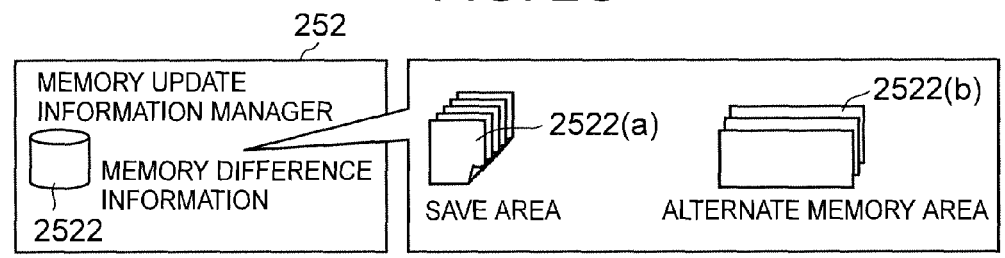
FIG. 2C shows the configuration of memory difference information (252)

FIG. 2C shows the configuration of the memory difference information (252).

The memory difference information (252) comprises a copy area (2522(a)) and an alternate memory area (2522(b)). The alternate memory area (2522(b)) is a storage area that is used instead of a physical page.

Either one or both of a physical storage area based on the copy area (2522(a)) and a physical storage area based on the alternate memory area (2522(b)) may be inside the server apparatus (for example, may be included in the physical memory (12)), or may be outside of the server apparatus (for example, an external storage apparatus). In accordance with this, for example, a physical storage area based on a portion of the copy area (2522(a)) will be inside the server apparatus, and a physical storage area based on another copy area (2522(a)) will be outside of the server apparatus. This holds true for the alternate memory area (2522(b)) as well. Furthermore, one of the physical storage areas based on the copy area (2522(a)) and the physical storage area based on the alternate memory area (2522(b)) may be inside the server apparatus, and the other may be outside of the server apparatus. In a case where either the copy area (2522(a)) or the alternate memory area (2522(b)) is inside the server apparatus, this area may be in the physical memory (12) or in an area other than the physical allocation area.

The flow of processing carried out in this embodiment will be explained hereinbelow.

Figure 3:
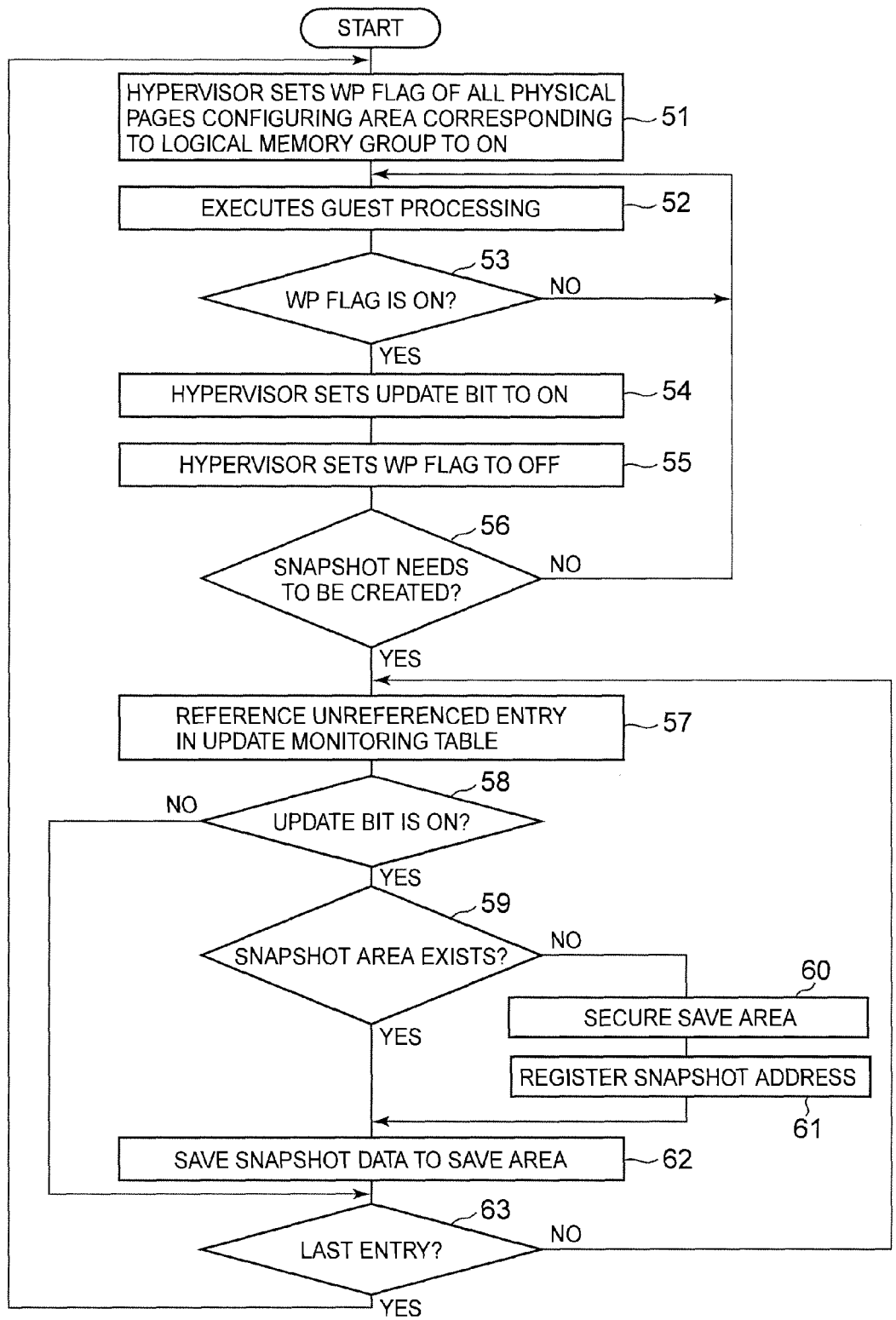
FIG. 3 shows the flow of processing related to a write protect and the acquisition of a snapshot image.

FIG. 3 shows the flow of processing related to a write protect and a snapshot image acquisition. This processing is executed either regularly or irregularly.

First, the hypervisor (2) (the CPU virtualizer (23)) sets the WP flags (2321(a)) for all the entries registered in the shadow page table (2321) to ON (Step 51). This transitions all of the physical pages configuring the physical allocation area (the area of the physical memory (12) allocated to the logical memory (32)) to the write protect mode. In accordance with this step, a physical page, which corresponds to a logical page to which the guest OS (4) is prohibited to write, also transitions to a state in which write is prohibited.

Thereafter, the hypervisor (2) executes guest processing (Step 52). That is, the guest OS (4) transitions to a state in which it is able to access the physical memory (12). In other words, a physical page in the physical allocation area will not be updated from the guest OS (4) unless this guest processing is carried out.

In Step 52, it is supposed that a certain guest OS (4) has received a write request specifying a guest logical address from a program that is being executed on this guest OS (4). In this case, a write process is carried out in accordance with this request. Specifically, the physical CPU (11), which executes this guest OS (4), identifies the host physical address corresponding to the specified guest logical address from the shadow page table (2321), and writes data in accordance with the write request to the physical page denoted by the identified host physical address.

Next, the physical CPU (11) determines whether or not the WP flag (2321(a)) in the entry comprising the above-mentioned identified host physical address (the entry of the shadow page table (2321)) is ON (Step 53).

In a case where the WP flag (2321(a)) is OFF (Step 53: NO), the processing of the physical CPU (11) ends. Thereafter, Step 52 is carried out when any guest OS (4) receives a write request.

In a case where the WP flag (2321(a)) is ON (Step 53: YES), processing transitions to the hypervisor (2) in accordance with the physical CPU (11) (for example, the hypervisor (2) is called from the physical CPU (11) using the above-mentioned identified host physical address). The hypervisor (2) (the memory update information manager (25)) sets the update bit (2521(a)) corresponding to the above-mentioned identified host physical address to ON (1) (Step 54). Then, the hypervisor (2) (the CPU virtualizer (23)) sets the WP flag (2321(a)) inside the entry comprising the above-mentioned identified host physical address (the entry of the shadow page table (2321)) to OFF (Step 55). Consequently, since Step 53 becomes NO even in a case where data is written at a point in time later than this point in time to a physical page for which the WP flag (2321(a)) was turned OFF, processing does not transition to the hypervisor (2). For this reason, a drop in the processing performance of the server apparatus is suppressed.

The hypervisor (2) (the memory update information manager (25)) determines whether or not it is necessary to create a snapshot image (Step 56). Specifically, for example, a determination is made as to whether or not the number of updated physical pages exceeds a prescribed threshold and/or whether or not the number of specified branch instructions in a fixed period of time exceeds a threshold. As the information used in the determination of this step, the number of I/O requests (write and/or read requests), the length of virtual machine execution time, and the order of priority of the virtual machines may be used either instead of or in addition to the example described hereinabove.

In a case where the result of the determination in Step 56 is negative (Step 56: NO), the processing ends. Thereafter, Step 52 is carried out when any guest OS (4) receives a write request.

In a case where the result of the determination in Step 56 is affirmative (Step 56: YES), the hypervisor (2) (the memory update information manager (25)) references one of the unreferenced entries in the update monitoring table (2521) (Step 57). In a case where this step has been carried out for the first time after Step 51 was performed, for example, the first entry will be referenced. Hereinafter, the referenced entry will be called the "target entry" in the explanation of FIG. 3.

Next, the hypervisor (2) (the memory update information manager (25)) determines whether or not the update bit (2521(a)) in the target entry is ON (1) (Step 58).

In a case where the update bit (2521(a)) is OFF (0) (Step 58: NO), and, in addition, the target entry is not the last entry (that is, an unreferenced entry still exists) (Step 63: NO), Step 57 is carried out.

In a case where Step 58 is NO, and, in addition, the target entry is the last entry (that is, there are no unreferenced entries) (Step 63: YES), all ON update bits (2521(a)) are turned OFF by the hypervisor (2) (the memory update information manager (25)) and the processing ends. Thereafter, Step 51 is carried out at a certain timing (for example, when a fixed period of time has elapsed since the immediately previous Step 51).

In a case where the update bit (2521(a)) is ON (1) (Step 58: YES), the hypervisor (2) determines whether or not the snapshot address (2521(b)) in the target entry is a valid value (Step 59). In other words, a determination is made as to whether or not a copy area (2522(a)) has already been associated with the physical page corresponding to the target entry.

In a case where the result of the determination of Step 59 is negative (Step 59: NO), the hypervisor (2) (the memory update information manager (25)) secures any copy area (2522(a)) that is not associated with a physical page (Step 60). Then, the hypervisor (2) (the memory update information manager (25)) registers the address of the secured copy area (2522(a)) in the target entry as the snapshot address (2521(b)) (Step 61).

In a case where the result of the determination of Step 59 is affirmative (Step 59: YES), or after Step 61, the hypervisor (2) (the memory update information manager (25)) copies the snapshot data in the physical page corresponding to the target entry to the copy area (2522(a)) that has been secured (Step 62). Thereafter, in a case where the target entry is not the last entry (Step 63: NO), Step 57 is carried out, and in a case where the target entry is the last entry (Step 63: YES), the processing ends. In a case where Step 63 is YES, all ON update bits (2521(a)) are turned OFF by the hypervisor (2), and the processing ends. Step 51 is carried out at a certain timing thereafter.

The preceding is the processing related to the write protect and the acquisition of a snapshot image. Furthermore, to reduce the number of times that Step 57 is carried out, only an entry in which the update bit (2521(a)) of the update management table (2521) has been newly set to ON (1) may be targeted in Step 57. In accordance with this, information (for example, a table) denoting where the entry in which the update bit (2521(a)) has been newly set to ON (1) is located may be managed by the hypervisor (2).

Figure 4:
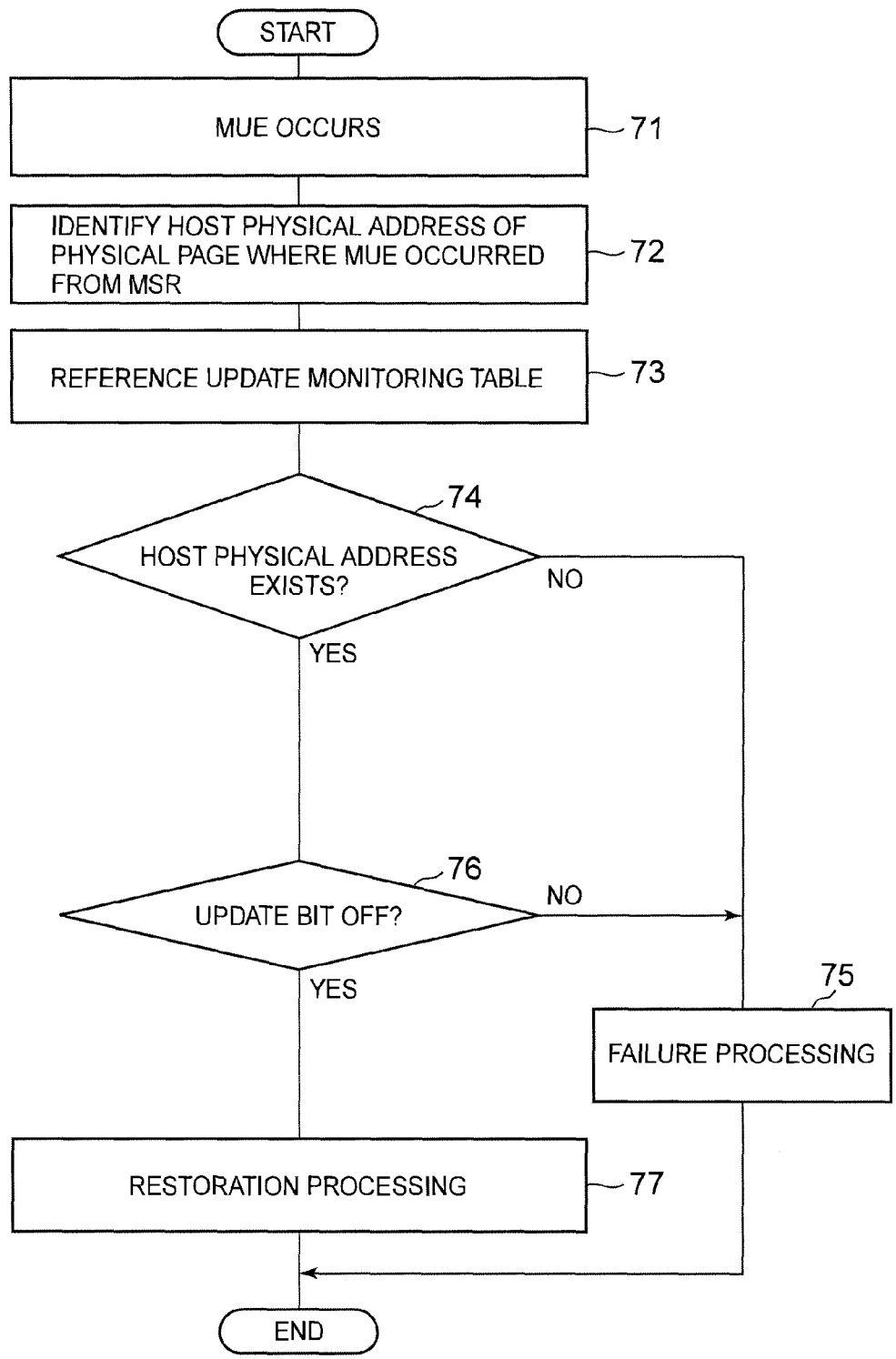
FIG. 4 shows the flow of processing performed when a MUE occurs.

FIG. 4 shows the flow of processing carried out when a MUE has occurred.

When a MUE has occurred (Step 71), the host physical address of the physical page (hereinafter, the MUE page) in which the MUE occurred is written to the MSR (111) in the physical CPU (11). The hypervisor (2) (the update information analyzer (251)) identifies the host physical address written to the MSR (111) (Step 72).

The hypervisor (2) (the memory update information manager (25)) references the update monitoring table (2521) (Step 73), and determines whether or not the host physical address identified in Step 72 is registered in this table (2521) (Step 74).

In a case where the result of the determination of Step 74 is negative (Step 74: NO), the hypervisor (2) carries out failure processing (Step 75). This failure processing will be explained in detail later by referring to FIG. 5.

In a case where the result of the determination of Step 74 is affirmative (Step 74: YES), the hypervisor (2) determines whether or not the update bit (2521(a)) in the entry comprising the host physical address identified in Step 72 is OFF (0) (Step 76).

In a case where the result of the determination of Step 76 is affirmative (Step 76: YES), the hypervisor (2) carries out restoration processing (Step 77). That is, the fact that the update bit (2521(a)) corresponding to the MUE page is OFF means that the data stored in the MUE page is stored in the copy area (2522(a)) associated with the MUE page (However, a physical page that has not been updated even once does not have any data that needs to be restored). Restoration processing is carried out for this reason. This restoration processing (Step 77) will be explained in detail later by referring to FIG. 6.

In a case where the result of the determination of Step 76 is negative (Step 76: NO), the hypervisor (2) carries out the failure processing (Step 75). The fact that the update bit (2521(a)) corresponding to the MUE page is ON means that the data stored in the MUE page has not been copied to the copy area (2522(a)). For this reason, the data inside this MUE page cannot be restored, and therefore the failure processing is carried out. Furthermore, a not-shown cache area most likely exists in the server apparatus for physical pages that are frequently rewritten. For this reason, in a case where Step 76 is NO (or Step 74 is NO), the hypervisor (2) determines whether or not data that is the same as the data in the MUE page remains in the cache area, and in a case where the same data exists, may copy this same data to the MUE page or the alternate memory area (the same processing as that of either Step 795 or Step 796 of FIG. 6 may be carried out).

Figure 5:
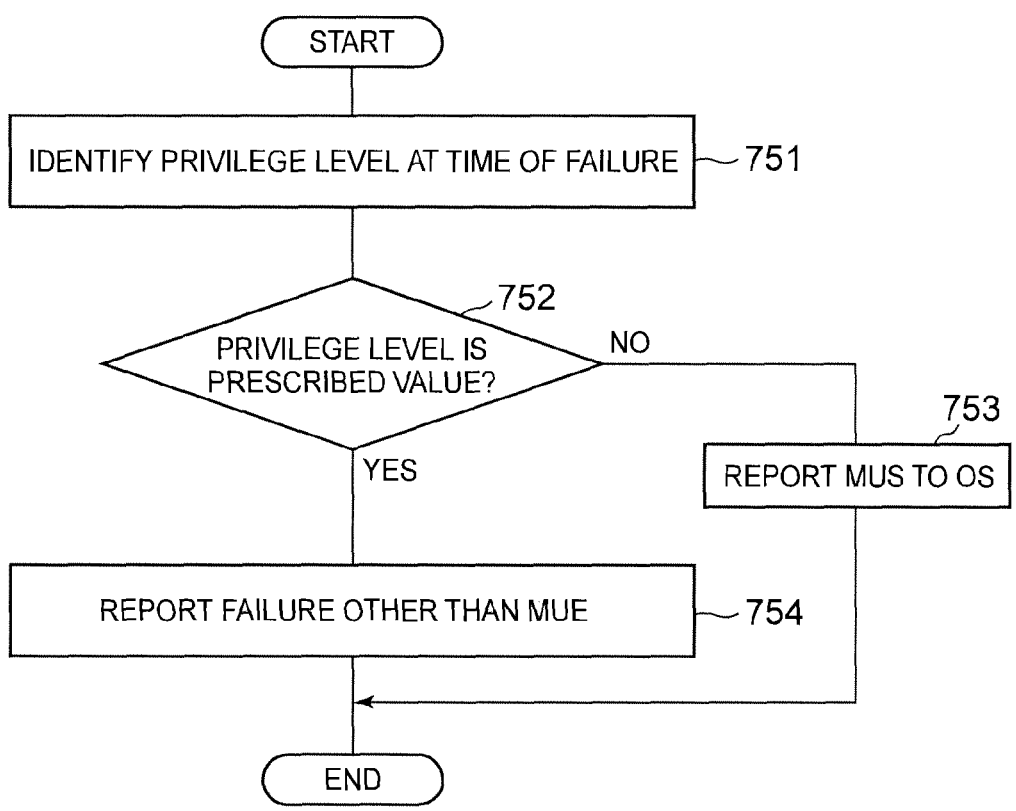
FIG. 5 shows the flow of failure processing of Step 75 of FIG. 4.

FIG. 5 shows the flow of failure processing in Step 75 of FIG. 4.

The hypervisor (2) identifies the privilege level of the physical CPU (11) at the time a failure (MUE) occurred (Step 751). Information denoting this privilege level is stored in a storage area, such as the physical CPU (11) register or a prescribed area (for example, an area other than the physical allocation area) of the physical memory (12). Referencing this information makes it possible to identify the privilege level.

The hypervisor (2) checks whether the privilege level is a prescribed value (for example, a value that signifies a low level of importance) (Step 752). The privilege level will differ in accordance with the program being executed on the virtual machine. For example, the privilege level in a case where an application program was being executed at the time the MUE occurred will be lower than the privilege level in a case where the guest OS (4) was being executed at the time of the MUE. In this embodiment, the larger the value of the privilege level, the lower the privilege level.

In a case where the privilege level is a prescribed value (for example, 3) (Step 752: YES), the hypervisor (2) reports a failure other than a MUE (for example, a #GP (general protection exception)) (Step 754). The report destination is the virtual machine to which the MUE page is allocated (for example, the guest OS (4) inside this virtual machine). The hypervisor (2) carries out processing so as to disguise the cause of the failure and focus the impact thereof solely on the application program. In accordance with this, even though a MUE occurred, its affects are minimized. Specifically, for example, the guest OS (4) in the virtual machine that receives a report of a failure other than a MUE will only end the application program.

Alternatively, in a case where the privilege level is not a prescribed value (for example, a 0) (Step 752: NO), the hypervisor (2) reports MUE to the virtual machine (for example, the guest OS (4)) to which the MUE page is allocated (Step 753). The processing thereafter will depend on the virtual machine (the guest OS (4)) that received this report. For example, this guest OS (4) may reboot.

The memory update information manager (252) of the hypervisor (2) may carry out this kind of failure processing.

Figure 6:
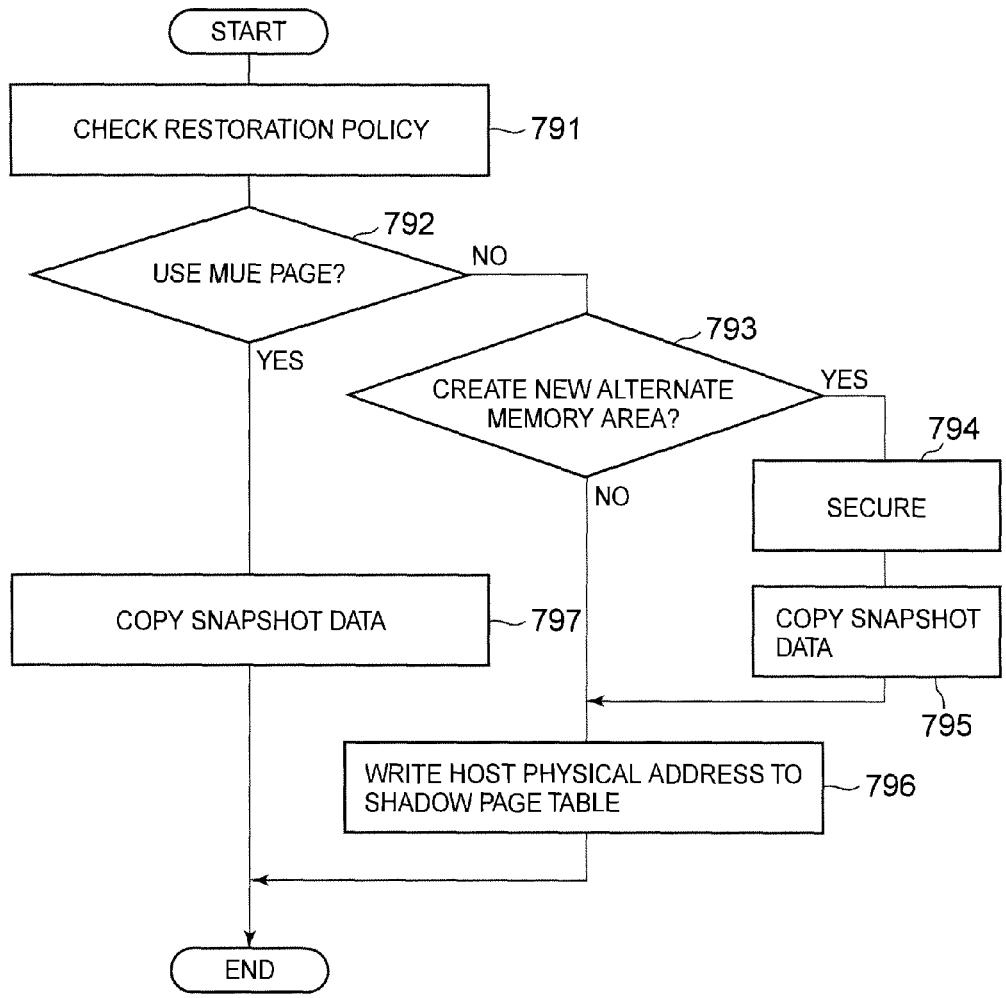
FIG. 6 shows the flow of restoration processing of Step 79 of FIG. 4.

FIG. 6 shows the flow of restoration processing in Step 79 of FIG. 4.

The restoration processor (2523) of the hypervisor (2) checks a restoration policy (Step 791). The restoration policy is information denoting a definition as to how data is to be restored under which cases.

In a case where the restoration policy states "use the MUE page" (Step 792: YES), the restoration processor (2523) copies the snapshot data from the copy area (2522(a)) to the MUE page (Step 797). This copy area (2522(a)) is a storage area identified from the snapshot address (2521(b)) corresponding to the MUE page.

In a case where the restoration policy states "Do not use the MUE page" (Step 792: NO), and, in addition, states "Create a new alternate memory area" (Step 793: YES), the restoration processor (2523) secures an alternate memory area (2522(b)) (Step 794). Then, the restoration processor (2523) copies the snapshot data in the copy area (2522(a)) corresponding to the MUE page to the secured alternate memory area (2522(b)) (Step 795). Thereafter, the restoration processor (2523) writes the address of this alternate memory area (2522(b)) to the shadow page table (2321) as the host physical address (Step 796).

In a case where the restoration policy states "Do not use the MUE page" (Step 792: NO), and, in addition, states "Do not create a new alternate memory area" (Step 793: NO), the restoration processor (2523) writes the address of the copy area (2522(a)) corresponding to the MUE page to the shadow page table (2321) as the host physical address (Step 796).

Figure 7:
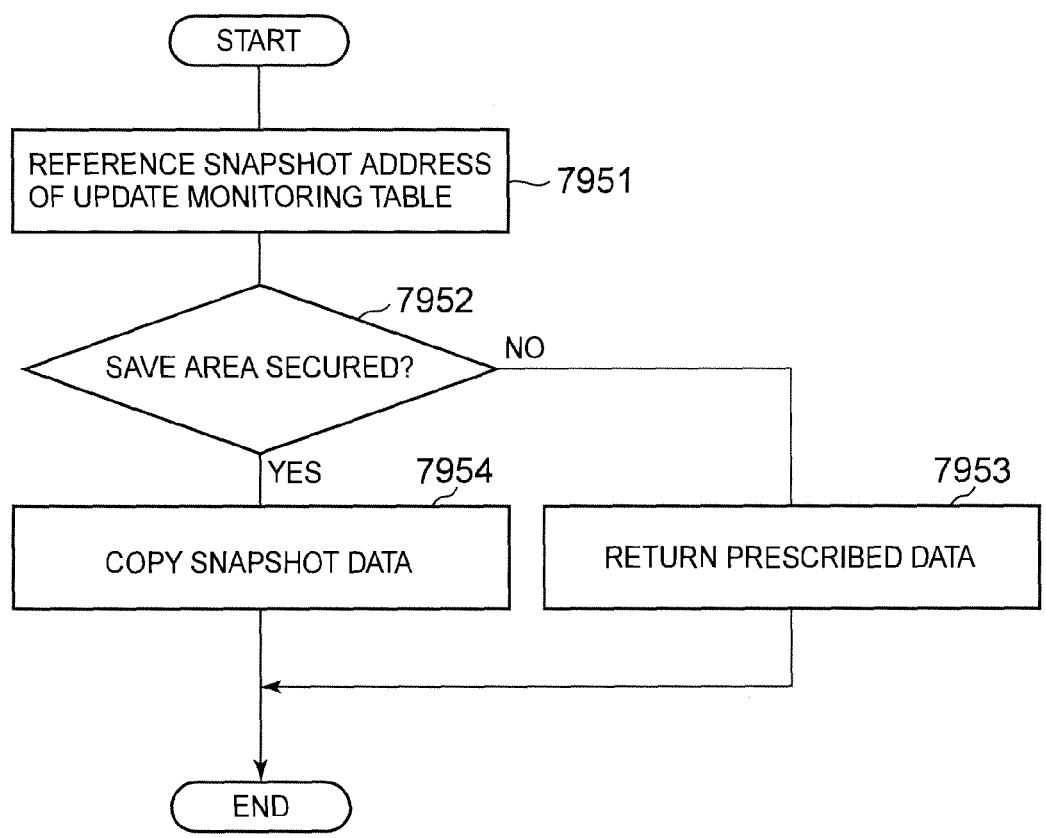
FIG. 7 shows the flow of copy processing of Steps 795 and 797 of FIG. 6.

FIG. 7 shows the flow of copy processing in Steps 795 and 797 of FIG. 6.

The restoration processor (2523) checks the snapshot address (2521(b)) corresponding to the MUE page (Step 7951).

The fact that the snapshot address (2521 (a)) is an invalid value means that the MUE page has not been updated even once prior to this. In this case (Step 7952: NO), the restoration processor (2523) returns prescribed data (for example, all 0s or 0xFFFFFFFF) to the program running on the guest OS (4).

In a case where the snapshot address (2521(b)) is a valid value (Step 7952: YES), the restoration processor (2523) copies the data in the copy area (2522(a)) denoted by this value to either the MUE page or the alternate memory area (Step 7954).

According to the embodiment described hereinabove, regardless of whether or not the guest OS (4) is permitted to write, the hypervisor (2) sets all the physical pages configuring the physical allocation area corresponding to the guest OS (4) (the area corresponding to the logical memory (32) of the virtual machine on which the guest OS (4) is being executed) to the write protect mode. Then, each time a write request is issued to a write protected physical page, the hypervisor (2) manages this physical page as an updated physical page, and, in addition, releases the write protection of this physical page (sets write enabled). Thereafter, in the case of a snapshot acquisition point (S56 of FIG. 3: YES), the hypervisor (2) copies data (snapshot data) in the updated physical page to a storage area (copy area) that differs from the physical allocation area (retains the snapshot data of an un-updated physical page on this physical page). In a case where a MUE has occurred in the copy-source physical page of the snapshot data, the snapshot data is restored from the copy area. Furthermore, in a case where a write request has been issued to a write-enabled physical page, the data is written to this physical page in accordance with this write request without the processing transitioning to the hypervisor (2). Therefore, the frequency at which the processing performance of the server apparatus executing the hypervisor (2) drops can be held in check while realizing the restoration of the data in the MUE page.

One embodiment of the present invention has been explained above, but the present invention is not limited to this embodiment, and it goes without saying that various changes are possible within a scope that does not depart from the gist thereof.

For example, a table has been used as one example of information, but the information managed in a table may also be managed in a format other than a table. For this reason, "xx table" may also be called "xx information".

Furthermore, for example, the guest logical address or the guest physical address may be registered in the update monitoring table (2521) instead of the host physical address. In accordance with this, the table (2521) may be referenced after converting the host physical address (the host physical address of the MUE page) identified from the MSR (111) to the guest logical address or the guest physical address.

Furthermore, for example, the restoration policy may be "in a case where the number of times a MUE has occurred in the same area (for example, the physical page) is less than N times, use this area (for example, the MUE page), and in a case where this number of times is equal to or larger than N times, use a different area (for example, either the copy area or a new alternate memory area)" (N being an inter equal to or larger than 1). In accordance with this, the memory update information manager (252) may manage the number of MUE occurrences for each physical page in the physical allocation area (and each storage area to which a physical allocation area host physical address has been allocated). The memory update information manager (252) (for example, the failure information analyzer (251)) may update the number of times that MUE has occurred in a storage area (for example, a physical page) in a case where a MUE occurrence has been detected. The restoration processor (2523), in a case where the number of post-update occurrences is less than N times, may copy the snapshot data in the copy area to this storage area. Alternatively, in a case where the number of post-update occurrences is equal to or larger than N times, the restoration processor (2523) may allocate the host physical address of the storage area in which the MUE occurred to either the copy area or a new alternate memory area (that is, either Step 796, or Steps 794 through 796 of FIG. 6 may be carried out).

What is claimed is:

1. A non-transitory computer readable medium comprising a hypervisor, which is executed on a server apparatus having a physical memory and a physical processor, comprising:
    a write controller configured to control a write from the physical processor to a physical area; and
    an area manager configured to manage a physical allocation area, which is a storage area that is allocated to a virtual machine from within the physical memory, and which is configured from a plurality of physical areas,
    (A) wherein the write controller is configured to set all the physical areas configuring the physical allocation area to a write protect mode;
    (B) wherein, after step (A), when the physical processor has identified that a write-destination area, which is the physical area specified in a write request issued by the virtual machine, is in the write protect mode,
        (b1) the area manager is configured to perform the step of managing the write-destination area as an updated area, and,
        (b2) the write controller is configured to perform the step of canceling the write protect mode of the write-destination area;
    (C) wherein the area manager is configured to perform the step, after step (A), at the time of a snapshot acquisition, of copying data in the updated physical area, from among all the physical areas configuring the physical allocation area, to a copy area, which is a storage area that is different from the physical allocation area, and
    wherein the area manager is configured to perform the step, subsequent to step (C), of managing the updated physical area as an updated area and as a non-updated area, and to perform step (A) again; and
    (D) when the occurrence of a prescribed failure in a physical area has been detected, the area manager is configured to perform the step of restoring data from the copy area that stores a copy of the data stored in a failure area, which is the physical area in which the prescribed failure has occurred, and when the occurrence of a prescribed failure in the physical area is detected, and the failure area is managed as a non-updated area, the area manager is configured to perform the step of identifying a privilege level of the physical processor at the time the prescribed failure has occurred, and to carry out processing in accordance with this privilege level.

2. The non-transitory computer readable medium comprising a hypervisor according to claim 1, wherein in the (A), the write controller is configured to make a setting, in physical area management information which is information that the physical processor references when writing data to a physical area, that all the physical areas configuring the physical allocation area are in the write protect mode.

3. The non-transitory computer readable medium comprising a hypervisor according to claim 2, wherein the prescribed failure is a Memory Uncorrectable Error.

4. The non-transitory computer readable medium comprising a hypervisor according to claim 1, wherein in the (D), the area manager is configured to report the prescribed failure to a virtual machine, to which the failure area is allocated, in the case where the privilege level is a first level, but in a case where the privilege level is a second level, to report a failure that differs from the prescribed failure to the virtual machine to which the failure area is allocated.

5. The non-transitory computer readable medium comprising a hypervisor according to claim 4, wherein the first level is a level that denotes an OS has been executed at the time of the prescribed failure occurrence in the virtual machine to which the failure area is allocated, and the second level is a level that denotes an application program has been executed at the time of the prescribed failure occurrence in the virtual machine to which the failure area is allocated.

6. The non-transitory computer readable medium comprising a hypervisor according to claim 1, wherein in the (D), in a case where the occurrence of a prescribed failure in the physical area is detected, and the failure area is managed as not having been updated, and also there is no storage area storing a copy of the data that has been stored in the failure area, the area manager is configured to return prescribed data.

7. The non-transitory computer readable medium comprising a hypervisor according to claim 1, wherein in the (D), the restoration of data from the copy area refers to the copying of data, which is in the copy area, to the failure area.

8. The non-transitory computer readable medium comprising a hypervisor according to claim 1, wherein in the (D), the restoration of data from the copy area refers to allocation of the address allocated to the failure area to the copy area instead of to the failure area.

9. The non-transitory computer readable medium comprising a hypervisor according to claim 1, wherein in the (D), the restoration of the data from the copy area refers to the copying of the data in the copy area to an alternate area, which is a storage area that is different from the physical allocation area and the copy area, and, in addition, allocation of the address allocated to the failure area to the alternate area instead of to the failure area.

10. The non-transitory computer readable medium comprising a hypervisor according to claim 1, wherein in the (D), the area manager is configured to change the data restoration destination from the copy area in accordance with the restoration policy.

11. A server apparatus comprising:
a physical memory; and
a physical processor configured to execute a hypervisor, wherein (A) the hypervisor is configured to set all physical areas configuring a physical allocation area, which is a storage area that is allocated to a virtual machine from within the physical memory and is configured from a plurality of physical areas, to a write protect mode;

(B) in a case, after step (A), where the physical processor has identified that a write-destination area, which is the physical area specified in a write request issued by the virtual machine, is in the write protect mode,
  (b1) the hypervisor is configured to manage the write-destination area as an updated area, and,
  (b2) the hypervisor is configured to cancel the write protect mode of the write-destination area;

(C) in a case, after step (A), at the time of a snapshot acquisition, the hypervisor is configured to copy data in the updated physical area from among all the physical areas configuring the physical allocation area to a copy area, which is a storage area that differs from the physical allocation area, and subsequent to step (C), the hypervisor is configured to manage the updated physical area as an updated area and as a non-updated area, and to perform step (A) again; and (D) in a case where the occurrence of a prescribed failure in a physical area has been detected, the hypervisor is configured to restore data from the copy area that stores a copy of the data stored in a failure area, which is the physical area in which the prescribed failure has occurred; and in a case where the occurrence of a prescribed failure in the physical area is detected, and the failure area is managed as a non-updated area, the hypervisor is configured to identify a privilege level of the physical processor at the time the prescribed failure has occurred, and to carry out processing in accordance with this privilege level.

12. A server apparatus according to claim 11, wherein
in the (A), the hypervisor is configured to make a setting, in physical area management information which is information that the physical processor references when writing data to a physical area, that all the physical areas configuring the physical allocation area are in the write protect mode, and
in the (B), the physical processor is configured to identify from the physical area management information that the write-destination area is in the write protect mode.

* * * * *